United States Patent

Murota

[15] 3,650,868
[45] Mar. 21, 1972

[54] METHODS AND APPARATUS FOR MANUFACTURING PIPE-SHAPED ARTICLES FROM FOAMED THERMOPLASTIC RESIN

[72] Inventor: George Murota, Tokyo, Japan
[73] Assignee: The Furukawa Electric Co., Ltd., Tokyo, Japan
[22] Filed: Mar. 20, 1969
[21] Appl. No.: 808,806

[30] Foreign Application Priority Data

Mar. 27, 1968   Japan..................................43/19412

[52] U.S. Cl..............................156/203, 138/128, 156/218, 156/425, 156/466
[51] Int. Cl........................................................B29d 23/10
[58] Field of Search....................156/78, 203, 215, 218, 466, 156/425, 79; 264/45, 248, 321; 138/128, 151, 177

[56]   References Cited

UNITED STATES PATENTS

| | | | |
|---|---|---|---|
| 3,400,029 | 9/1968 | Mesrorian et al. | 156/425 X |
| 3,497,413 | 2/1970 | Ullman et al. | 156/425 |
| 1,944,970 | 1/1934 | Dieffenbach | 138/151 |
| 2,936,792 | 5/1960 | MacCracken et al. | 156/78 |
| 3,279,503 | 10/1966 | Carbone et al. | 138/128 |
| 3,366,719 | 1/1968 | Lueders | 138/177 |

FOREIGN PATENTS OR APPLICATIONS

671,644   10/1963   Canada..................................156/203

Primary Examiner—Benjamin A. Borchelt
Assistant Examiner—G. E. Montone
Attorney—Flynn & Frishauf

[57]   ABSTRACT

Methods and apparatus for manufacturing pipe-shaped articles from foamed thermoplastic resin which comprise turning the foamed thermoplastic resin sheet such as foamed polyethylene, foamed polypropylene, or foamed polyvinyl chloride, heating the abutting or contacting surfaces of the sheet and joining the sheet.

18 Claims, 27 Drawing Figures

GEORGE MUROTA,
INVENTOR.

METHODS AND APPARATUS FOR MANUFACTURING PIPE-SHAPED ARTICLES FROM FOAMED THERMOPLASTIC RESIN

The present invention relates to the manufacture of pipe-shaped articles from foamed thermoplastic resin and more particularly, to methods and apparatus for manufacturing with a high efficiency, pipe-shaped articles from foamed thermoplastic resin.

In recent years, foamed articles have been used in a broad range of applications such as heat insulating materials, packing materials, and interior furnishing material for vehicles. Pipe-shaped foamed articles are used for heat insulating materials, for piping and as packing for bar-shaped goods, particularly those whose surface is readily subject to damage.

One of the methods heretofore used in forming these pipe-shaped foamed articles consists of heating and expanding foamed material in a mold and thereafter cooling the mold to make a desired shape. Another conventional process is to wrap a single or multiple layers of foamed sheet material, and thereafter wrap paper or cloth sheet around said foamed material to prevent its deformation and heat the foamed material for a certain length of time, followed by cooling.

However, the former prior art process requires many expensive molds to make pipe-shaped articles of different outer or inner diameters. These conventional processes, batch processes in which highly heat-insulating foamed material must be wholly heated, requires much heating and cooling time, rendering high-efficiency production impossible.

The present invention is intended to manufacture efficiently pipe-shaped foamed articles from foamed thermoplastic resin sheet, and in particularly characterized by turning the sheet heating surfaces of the sheet and joining the heated surfaces of the sheet to form pipe-shaped articles efficiently. Foamed materials used in the present invention are flexible or semirigid thermoplastic resin foams such as of polyolefines, olefines copolymerized with other components, cross-linked polyolefins, vinyl polymers, and natural or synthetic rubbers mixed with these polymers. In the first aspect of the invention, a foamed thermoplastic resin sheet is continuously turned into a pipe shape, and its longitudinal sides (1a and 1b in FIG. 3d) are heated and joined together to form a desired pipe-shaped article.

Figure 17:
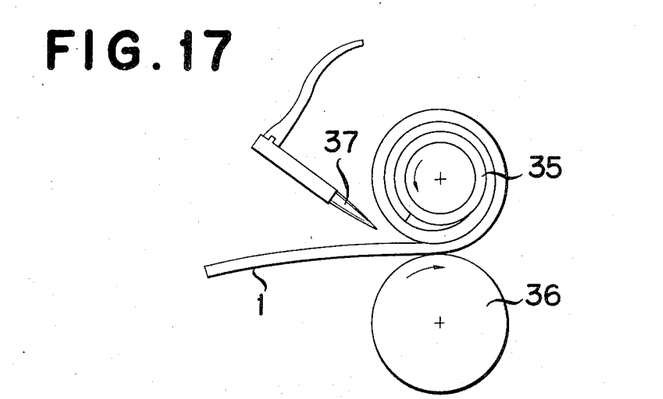
FIG. 17 is a schematic illustration of a fifth embodiment of the invention.

In the second aspect of the invention, foamed thermoplastic resin sheet is wound around a core in a plurality of layers, and the opposite surfaces of the adjacent layers are heated and joined successively as the sheet winding goes on, thus forming a multilayer pipe-shaped article (FIG. 17).

This invention can be more fully understood from the following detailed description when taken in connection with the accompanying drawings, in which.

Figure 1:
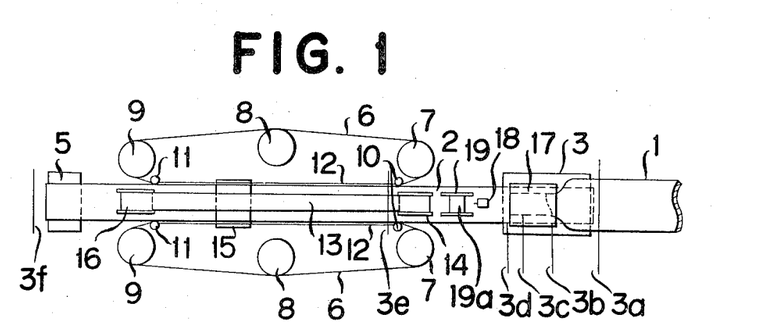
FIG. 1 is a plan view of an apparatus for continuously manufacturing pipe-shaped articles of foamed thermoplastic resin according to an embodiment of the present invention.
Figure 2:
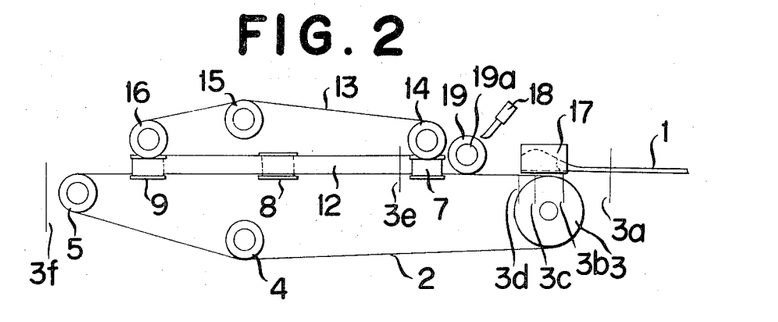
FIG. 2 is a side view of the apparatus of FIG. 1.
Figure 3A:
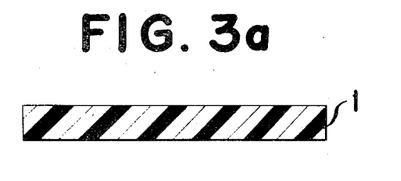
FIGS. 3a, 3b, 3c, 3d, 3e and 3f are successive views of the cross sections of foamed sheet material being turned into a pipe shape, on lines, 3a, 3b, 3c, 3d, 3e and 3f respectively of FIGS. 1 and 2.
Figure 3B:
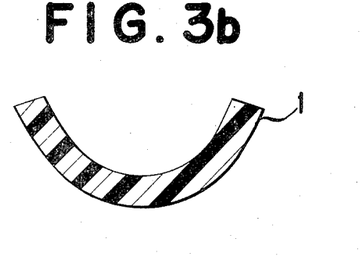
Figure 3C:
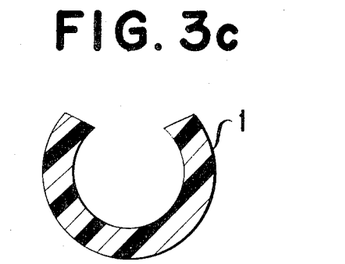
Figure 3D:
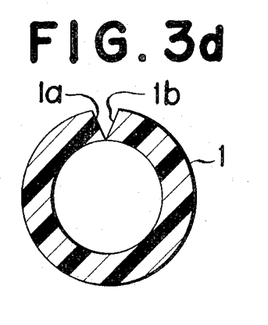
Figures 3E, 4:
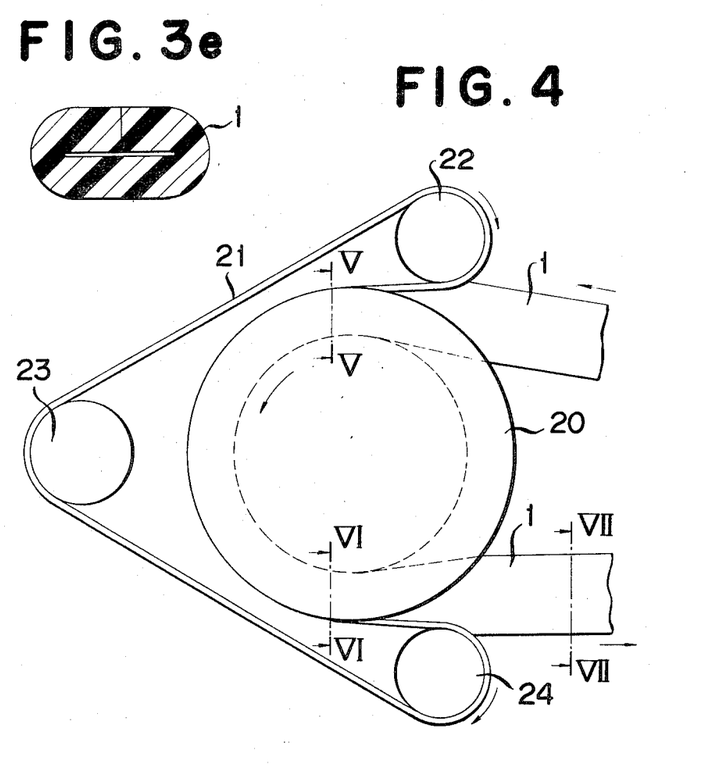
FIG. 4 is a partly enlarged side view of an apparatus according to a second embodiment of the present invention.

The first embodiment of the invention is shown in FIGS. 1, 2 and 3a to 3f. In FIGS. 1 and 2, 1 is a foamed thermoplastic resin sheet used in the present invention. The sheet is successively transformed by die 17 to have such cross sections as shown in FIGS. 3a, 3b, 3c and 3d, with its longitudinal sides 1a and 1b eventually coming into contact with other. The longitudinal sides 1a and 1b are heated and melted by heating device 18, and then the sheet transformed into pipe shape is flattened by a guide roll 19, as shown in FIG. 3e to join the longitudinal sides together.

Figure 3F:
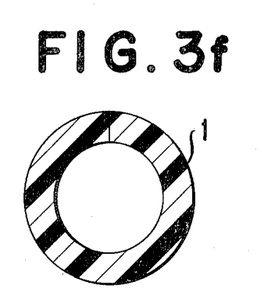

The pipe-shaped article, while being kept flattened by four belts, upper, lower, right and left, is cooled at the joined longitudinal sides and, when the pressure is removed, returns to the pipe shape as shown in FIG. 3f. The die 17 is so designed as to change successively the cross section of the foamed material sheet as shown in FIGS. 3a to 3d as the sheet travels forward therethrough. Upon leaving the die 17 the sheet assumes a pipe shape whereby as illustrated in FIG. 3d, the lengthwise parallel side faces 1a and 1b are positioned opposite to each other in a manner to form a V-shaped clearance. Next to the die 17, there are a heating means 18 such as electric soldering iron, burner or hot air injector and a guide roll 19. The guide roll 19 has a prescribed width and is fitted with a pair of flanges on both sides at a prescribed interval. Further the guide roll 19 is so positioned (for instance higher than the die 17) as to bring the longitudinal side faces of the sheet in a close contact with each other. Accordingly, when it reaches the guide roll 19 the sheet undergoes a certain degree of tension, and is compressed flat as shown in FIG. 3e. In such compressed state, the longitudinal side faces 1a and 1b of the sheet which have previously been heated by the heating means 18 are joined firmly together.

It is important not to permit the heated joint to contact with the guide roll 19.

The longitudinal side faces 1a and 1b of the sheet can be joined together not only by the heating means 18 but also by the use of molten resin of the same kind as that of the sheet.

A shaping means is composed of four belts, 2, 6, 6', and 13 respectively, and sends forward a pipe-shaped foamed article, keeping it as flattened by guide roll 19 while its melt-bonded joint is cooled.

A lower horizontal belt 2 is disposed on the underside of said shaping means, and rotates, guided by three guide rolls 3, 4 and 5. The shaping means also has a pair of vertical side belts 6 positioned on both sides thereof. These vertical belts rotate, guided by major guide rolls 7, 8 and 9 respectively and a pair of minor guide rolls 10 and 11 respectively so as to control the width of the shaping means. Between the minor guide rolls 10 and 11 (hereinafter description is only given of one of the pair of members for the sake of briefness) there is stretched a guide plate 12 so as to preserve the uniform width of the shaping means all across the minor guide rolls 10 and 11. The shaping means also has an upper horizontal belt 13 which rotates, guided by guide rolls 14, 15 and 16. Accordingly, the four belts constituting the shaping means, i.e., the lower horizontal belt 2, a pair of vertical side belts 6 and upper horizontal belt 13, define a rectangular cross sectional shape, across the minor guide rolls 10 and 11. Therefore, when foamed material is introduced, it always undergoes compression from the belts 2, 6 and 13 and assumes the aforementioned flatly compressed form, whose peripheral outline (or cross sectional shape) is approximately rectangular. The cross sectional size of the shaping means can be freely varied by changing the position of the aforesaid four upper, lower, right and left belts.

Therefore, pipe-shaped foamed plastic articles of various sizes can be produced continuously and efficiently by one and the same equipment.

There will now be described by reference to FIGS. 3a to 3f the sequential manufacturing steps according to the first embodiment of the present invention. The cross sectional shapes of FIGS. 3a to 3f which the sheet of foamed material 1 assumes in turn while it is being worked correspond to those presented by said sheet when it passes points 3a to 3f indicated by the lines of FIGS. 1 and 2. Upon leaving the die, the sheet takes such a cross sectional form as illustrated in FIG. 3d, in which the opposite side faces 1a and 1b of the rolled sheeting define a V-shaped clearance where the end faces are attached to each other at the inner end of the clearance, i.e., at the root of the V-shape and set more widely apart from each other toward the outer side of the clearance. The rolled sheet bearing the cross sectional shape of FIG. 3d is transferred to the guide roll 19 whose surface contacting the sheet is located at a relatively higher position than the outlet of the die 17. As it approaches the guide roll 19, the sheet undergoes tension in its lengthwise direction or travelling direction, and the V-shaped clearance of FIG. 3d is progressively reduced. Further, a pair of flanges fitted to both sides of the guide roll 19 have an interval therebetween equal to the lateral width of the cross section of the flattened sheet shown in FIG. 3e, so that when the rolled sheet is brought to the guide roll 19, it is compressed sidewise between said paired flanges, causing the V-shaped clearance to be fully closed up as shown in FIG. 3e. Since there is installed between the die 17 and guide roll 19 a heating means 18 such as an electric soldering iron, the side faces of the sheet can be fused together by the electric soldering iron. While the flattened sheet is allowed to cool so as to have its joined side faces firmly set during its transit through the passage of the shaping means, it is still retained in the cross sectional form of FIG. 3e. Upon leaving the shaping means, the flattened sheet swells out due to the elasticity of the foamed material to assume the cross sectional form of FIG. 3f at point 3f of FIGS. 1 and 2, namely to be made into a pipe-shaped article having a fully closed circular cross section.

The pipe-shaped foamed plastic article has a very large specific volume and therefore requires high transportation cost. Since the forming apparatus of the present invention is relatively inexpensive, those who use the pipe-shaped article in a large quantity can economically have their own forming apparatus and manufacture such articles by themselves to save the transportation which would be involved if they purchase it from its maker.

Figure 5:
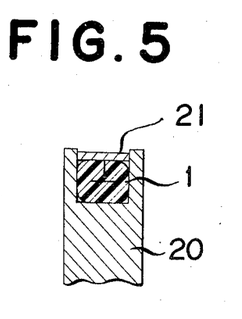
FIG. 5 is a sectional view on line V—V of FIG. 4.
Figure 6:
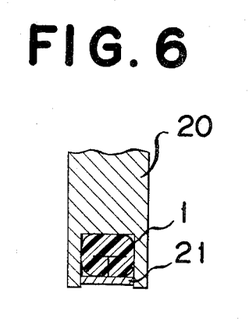
FIG. 6 is a sectional view on line VI—VI of FIG. 4.
Figure 7:
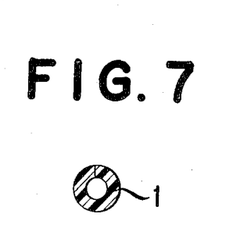
FIG. 7 is a sectional view on line VII—VII of FIG. 4.

In the first embodiment, the shaping means is formed of four upper, lower, right and left belts, while FIGS. 4 to 7 jointly represent another type of shaping means, or a second embodiment modified from the first embodiment. This modified shaping means comprises a roll 20 provided with a groove on the periphery, an endless belt 21 carried through the groove and, if necessary, guide rolls 22, 23 and 24. The groove of the roll 20 has a width substantially equal to the lateral width of the cross section of the flattened sheet shown in FIG. 3e. To meet the different diameters and wall thicknesses of pipe-shaped articles to be manufactured, the groove of the roll 20 should preferably be varied in width by a suitable means. As in the first embodiment, the rolled sheet 1 whose longitudinal side faces have been heated by a heating means 18 is transferred between the bottom plane of the groove of the roll 20 and the endless belt 21. While the heated side faces of the sheet are allowed to cool so as to be firmly joined during its transit through said shaping means, the heated sheet retains the flattened form. Upon leaving the shaping means, the flattened sheet naturally swells out due to the elasticity of the foamed material to be made into a pipe-shaped article having a circular cross section. FIGS. 5, 6 and 7 are sectional views on lines V—V, VI—VI and VII—VII respectively of FIG. 4, showing the varying forms assumed by the sheeting during its travel through the shaping means. The numerals of FIGS. 5 to 7 are all the same as those of FIG. 4.

The first embodiment makes use of a guide roll 19. But, an apparatus using no such guide roll, in which a heating means 18 is provided next to the die 17 and is followed by a shaping means, is adequate for production of the pipe-shaped foamed thermoplastic resin article in accordance with the present invention.

The second embodiment shows a case in which no guide roll 19 is used. The guide roll 19 has the function of applying a stress to the foamed thermoplastic resin sheet to press its longitudinal side faces against each other, and, when used between the die 17 and the shaping means as shown in the first embodiment, makes the operation easier.

Figure 8:
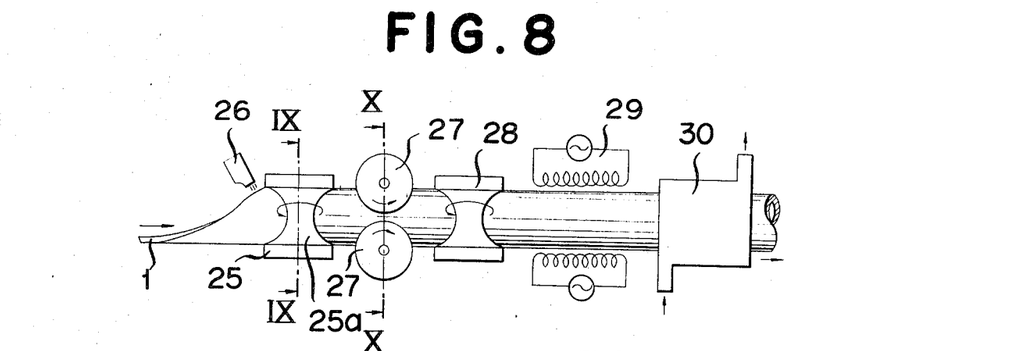
FIG. 8 is a schematic side view of an apparatus used in a third embodiment of the present invention.
Figure 9:
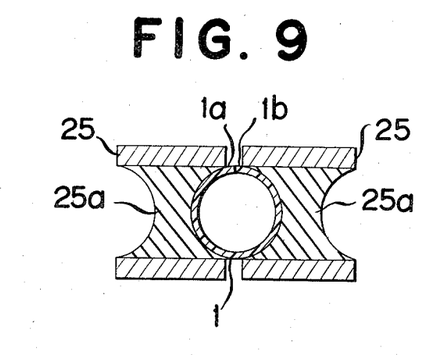
FIG. 9 is a sectional view on line IX—IX of FIG. 8.
Figure 10:
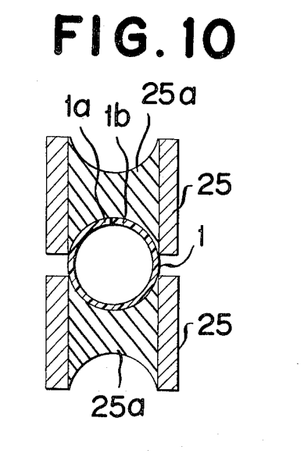
FIG. 10 is a sectional view on line X—X of FIG. 8.

There will now be described a third embodiment of the present invention with reference to FIGS. 8 to 10. Ahead of a foamed thermoplastic resin sheet having a prescribed width and thickness there are disposed a pair of guide rolls 25, each of which has, for example, such a semicircular inward curvature 25a that when both guide rolls 25 are assembled in place, their semicircular curvatures jointly conform to the circular cross section of a pipe-shaped article to be manufactured. When the sheet 1 is introduced between the paired guide rolls 25, it is so curved as to cause its longitudinal side faces 1a and 1b to be brought into contact with each other, said curving operation being continuously conducted. There is disposed on this side of the guide rolls 25 a heating means 26, for example, a hot air injector where its longitudinal side faces 1a and 1b are heated to a prescribed temperature by said heating means, so that while the sheet 1 travels through the guide rolls 25 its side faces 1a and 1b are joined together to form a pipe-shaped body. Beyond said guide rolls 25 there are installed in turn another pair of guide rolls 27 having the same size and shape as said guide rolls 25, and arranged in perpendicular relationship thereto, and preferably still another pair of guide rolls 28 having the same size and shape as said guide rolls 25 and disposed parallel thereto. These additional paired guide rolls 27 and 28 press in both vertical and horizontal directions the rolled sheet 1 continuously forwarded from the guide rolls 25 so as to maintain the curvature of the sheet 1 brought in a state bearing the cross section of a desired pipe-shaped product.

If necessary ahead of the guide rolls 28 is located a heating means 29, which uniformly heats the pipe-shaped sheet to eliminate its internal stress resulting from the deformation of the sheet. Further ahead of the heating means 29 is positioned a cooling means 30 which cools and hardens the pipe-shaped sheet thus treated in said heating means 29 to form a pipe-shaped article having a prescribed cross section.

Removal of the internal stress may be also made in the first and second embodiments. A pipe-shaped foamed plastic article, whose internal stress has been eliminated, has many advantages over the one with the internal stress uneliminated. Such a stress-free foamed plastic article retains a pipe shape even when later cut in the lengthwise direction and develops no contraction or deformation with the passage of time.

Figure 11:
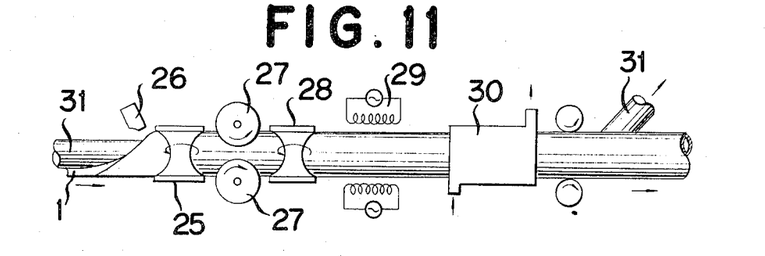
FIG. 11 is a schematic side view of an apparatus employed in a fourth embodiment of the present invention using a core modified from the third embodiment.
Figure 12:
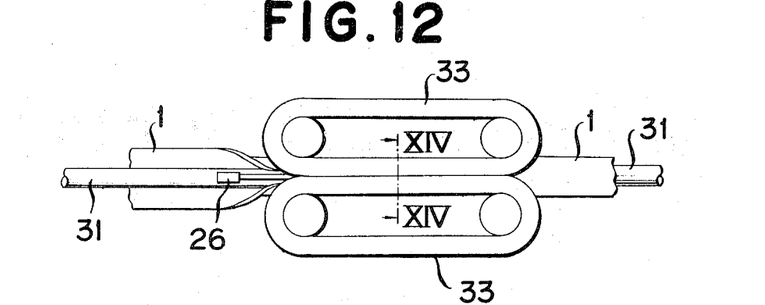
FIG. 12 is a plan view of an apparatus where the guide rolls of FIG. 11 are replaced by caterpillars.
Figure 13:
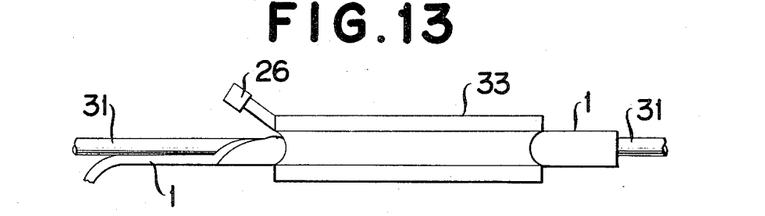
FIG. 13 is a side view of the apparatus of FIG. 12.
Figure 14:
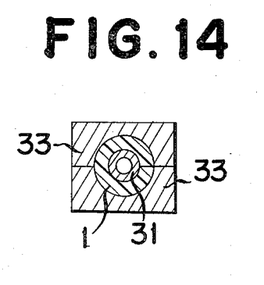
FIG. 14 is a sectional view on line XIV—XIV of FIG. 12.
Figure 15:
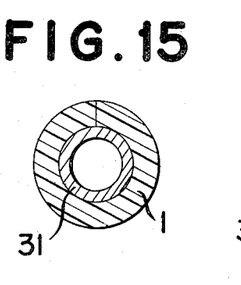
FIG. 15 is a cross section of a composite pipe which is obtained without removing the core involved in the fourth embodiment of the present invention.
Figure 16:
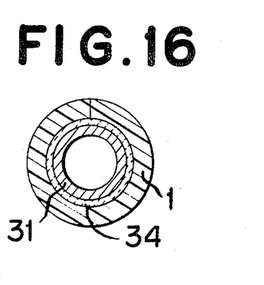
FIG. 16 is a cross section of another composite pipe containing a core involved in the fourth embodiment covered with heat insulating materials.

There will now be described by reference to FIGS. 11 to 14 a fourth embodiment modified from the third embodiment. The same parts of FIGS. 11 to 14 as those of FIGS. 8 to 10 are denoted by the same numerals and description thereof is omitted. In FIG. 11, a cylindrical core 31 is intended to facilitate the operation of curving the sheet 1. When the core is continuously carried along with the sheet 1 as a medium of affording an axial center in rolling up the sheet 1, and the same operation is carried out as in the third embodiment. Then the longitudinal side faces 1a and 1b of the sheet 1 are effectively joined together by a force caused by the contact between the circumferential surface of the core 31 and the guide rolls 25, 27 and 28, enabling a pipe-shaped article to be fabricated easily and unfailingly. In this case, the guide rolls 25, 27 and 28 may be replaced by caterpillars 33 shown in FIGS. 12 to 14. Where the core 31 is made of flexible material, it is possible to take it out of the pipe-shaped product leaving the cooling means through a cut opening when it is cut to a prescribed length by a cutter (not shown). In such case the flexible core is continuously taken up in a direction indicated by the arrow of FIG. 11. Even after the core 31 is removed, the pipe-shaped article which has already been cooled and hardened by the cooling means, does not return to its original sheet shape, but retains exactly the same pipe form as when it was initially processed. If during the aforesaid procedure, the core is not taken out, there will be obtained a composite pipe-shaped product consisting of the pipe-shaped sheet of foamed material and core 31 having an overall cross sectional pattern as illustrated in FIG. 15. For example, where a core 31 consisting of a copper pipe remains in the final product, there will be easily obtained a composite pipe-shaped article having good heat insulating property. If the aforementioned procedure involves a core 31 wrapped with good heat resistant material 34 such as glass wool, asbestos or rock wool, there will be produced a composite pipe-shaped article having greater heat resistance, its cross sectional pattern being presented in FIG. 16.

If a heated copper pipe is used in this fourth embodiment, it makes a firm bond with the surrounding plastic foam, thereby producing a composite pipe-shaped article of even better quality. The use of electric wire, instead of copper pipe can produce a foamed plastic insulated electric wire.

The foregoing third and fourth embodiments relate to the case where only the longitudinal side faces of the rolled sheet 1 where heated. It will be apparent that the whole of the sheet 1 may be heated, unless such heating causes variations in the thickness of said sheet 1.

The first to fourth embodiments of the first aspect of the present invention are characterized by the continuous formation of foamed plastic sheet into a pipe-shaped article, which renders it possible to manufacture at a low cost pipe-shaped foamed plastic articles of good quality in various sizes by means of very simple equipment.

The shaping means is usually about 0.5 to 8 meters long, and the takeup speed is about 1 to 10 meters per minute.

There will be described by reference to FIGS. 17 to 19 a fifth embodiment concretely representing a second aspect of the present invention. Referring first to FIG. 17, one end of foamed thermoplastic resin sheet 1 is fixed to a core 35. The core 35 rotates in interlocking relationship with a driving source (not shown). Adjacent to the core 35 is disposed a supporting roll 36 having an axis parallel to that of the core 35. This supporting roll 36 is intended to cause the sheet 1 to be pressed to the core 35 when it is wound about said core 35. There is also provided a heating means 37 at a point where the end of the preceding portion of the sheet corresponding approximately one rotation of the core 35 is superposed on the initial part of the succeeding similar portion of said sheet. When the core 35 rotates in the direction of the indicated arrow by the driving source, the sheet 1 is continuously wound on the core 35. In this case, the heating means 37 heats the adjacent surfaces of that portion of the sheet 1 last taken on the core 35 and that portion of the sheet 1 which is going to be wound next time about the core 35 so as to assure a good joint therebetween, thus forming a multilayer pipe-shaped article 38 shown in FIG. 18. Heating is preferably applied to both surfaces of adjacent layers of sheet, but may be applied only to either one of the surfaces. In this case, the heating means 37 should preferably consist of an infrared lamp, hot air or flames for heating only the surface of the sheet 1 to a suitable temperature, thereby to obtain a desired multilayer pipe-shaped article.

Figure 18:
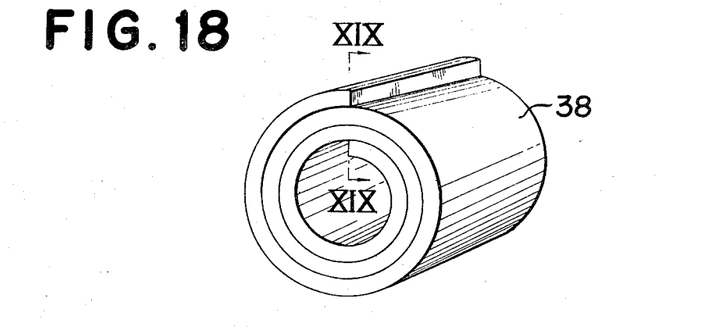
FIG. 18 is a perspective view of a pipe-shaped article of foamed material obtained by said fifth embodiment.
Figure 19:
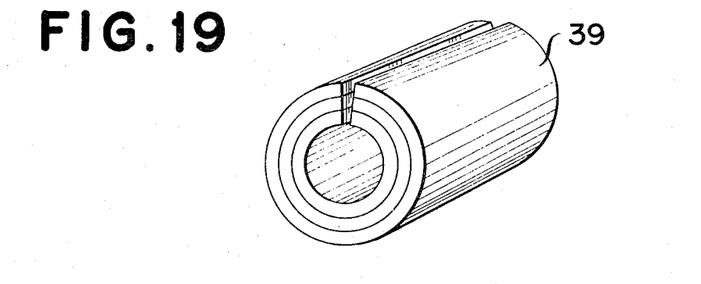
FIG. 19 is a perspective view of the pipe-shaped article of FIG. 18 cut open on line XIX—XIX.

When the multilayer pipe-shaped article 38 shown in FIG. 18 is cut on line XIX—XIX, there will be obtained a pipe-shaped product 39 which is cut apart at one point in a lengthwise direction. Since this pipe-shaped product 39 has a uniform thickness all around, it is particularly adapted for use as heat insulating material by being coated on the outside of various types of piping in common use. If, in this case, the core 35 consists of a type having a triangular, elliptical or square cross section, then there will be obtained a multilayer pipe-shaped product having a triangular, elliptical, or square cross section respectively.

Figure 20:
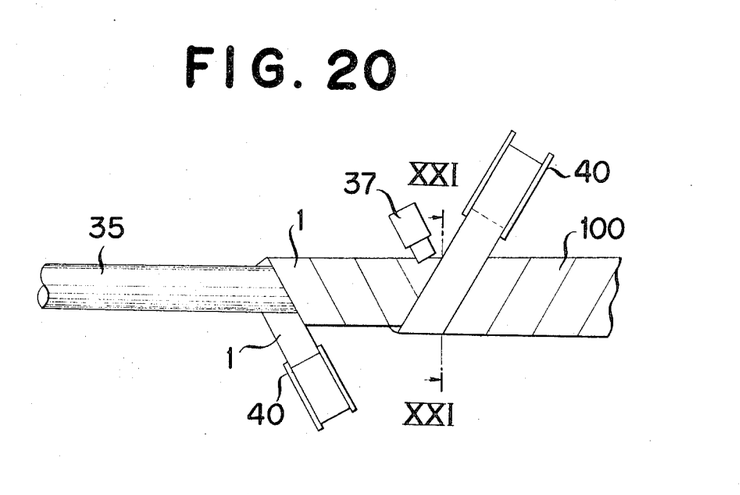
FIG. 20 is a schematic illustration of a sixth embodiment of the invention modified from said fifth embodiment.
Figure 21:
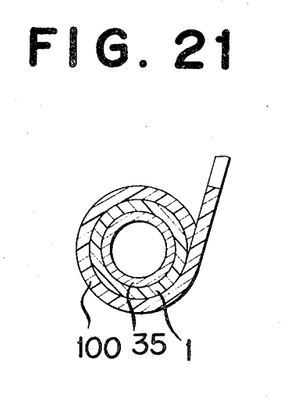
FIG. 21 is a sectional view on line XXI—XXI of FIG. 20.

There will now be described by reference to FIGS. 20 and 21 a sixth embodiment. The first ribbon-shaped sheet 1 continuously discharged from a drum 40 is helically and uniformly wound around the core 35, with the adjacent turns being in abutting relation without overlap. Further on said windings is helically wound a second ribbon-shaped sheet 100 of foamed thermoplastic resin in an opposite direction.

The outer surface of the foamed plastic sheet 1 wound on the core and the inside surface of the sheet 100 wound thereon are heated by the heat source 37 to form a continuous length of pipe-shaped article.

This example shows the production of a pipe-shaped article composed of two layers of foamed plastic sheet. In the same way it is possible to manufacture a pipe-shaped article composed of three or more layers of the sheet. It is also possible to produce such pipe-shaped article by staggering the seams of the adjacent sheet layers and winding them in the same direction.

By this method, pipe-shaped articles of very large wall thickness can be manufactured merely by heating only adjoining surfaces of foamed plastic sheets. It therefore takes far less time than the conventional method in which the foamed plastic sheet must be wholly heated for formation of a pipe-shaped article.

Figure 22:
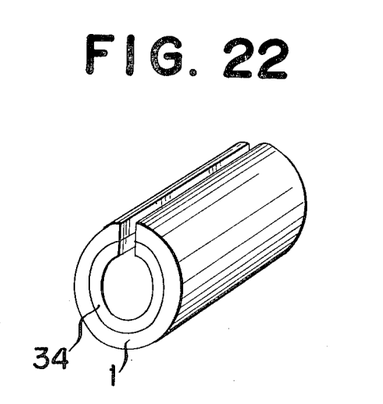
FIG. 22 is a perspective view of a pipe-shaped article prepared by the present invention, which is lined with heat insulating material.

If a pipe-shaped article prepared from foamed thermoplastic resin sheet according to the present invention is integrally lined with materials having a better heat resisting property than said foamed resin, there will be obtained a heat insulating composite pipe having excellent heat resisting properties capable of being used over a broad temperature range from high to low. To describe this procedure by reference to FIG. 22, good heat resistant material 34 such as glass wool, rock wool or asbestos is integrally lined on the inner surface of a pipe-shaped article prepared from foamed sheet, obtaining the aforementioned heat insulating product. The non-water absorbence of the foamed sheet 1 owing to the independent cell structure of the sheet 1 of foamed material and the heat resistance of the aforementioned lining 34 enable the resulting composite pipe-shaped product to be satisfactorily used over a broader temperature range from high to low and also in a larger field of application than when the product only consists of foamed sheet. To prove this effect, a copper pipe 18 mm in outer diameter was wrapped with a pipe-shaped cover of foamed cross-linked polyethylene 18 mm. in inner diameter and 15 mm. thick, and there was introduced steam at 120° C. through the copper pipe. In about 30 minutes deformation appeared in the foamed cross-linked polyethylene cover. Next the inner half portion 7.5 mm. thick of the wall of said polyethylene cover was replaced with glass wool. This composite pipe 2 was used continuously for 40 hours under the same conditions as described above. Then said composite pipe displayed no deformation.

As is apparent from the description of the foregoing embodiments, the present invention consists of turning a foamed thermoplastic resin sheet, heating the surface of the sheet and joining the heated surfaces of the sheet to prepare a pipe-shaped article of foamed resin. Accordingly, even without using a mold as has been required in the prior art method, the present invention enables a pipe-shaped article uniformly bearing a prescribed cross section to be fabricated in any desired length and in large quantities. The invention also reduces the cooling time because only the sheet surfaces are heated. These outstanding features markedly help to reduce the production cost.

The manufacturing methods shown in all the embodiments of the invention, except the fifth embodiment, are done continuously, and, therefore, produce with a high efficiency pipe-shaped foamed plastic articles of uniform quality. Especially, the methods in the first, second, and sixth embodiments can turn out pipe-shaped foamed plastic articles in many different outer diameters and wall thicknesses by the use of one and the same apparatus.

Further, according to the methods in the third, fourth and sixth embodiments, a composite body of pipe, rod, electric wire, or the like covered with the pipe-shaped foamed plastic article can be obtained if the former is used as a core.

As aforementioned, pipe-shaped foamed plastic articles of the present invention are very useful for many commercial applications because they are manufactured continuously and have a smooth appearance in a uniform formation and excellent heat insulating properties. Tests for the adhesion between the bonded end faces of a pipe-shaped article prepared by this procedure show that the bonded portions are not separated at all, and when attempts were made forcibly to set apart the bonded portions, the other parts of the pipe were first broken, presenting a fresh peel-off plane; This proved that the force with which the portions were bonded together was far greater than that required in destroying the foamed material itself.

Further as mentioned above, when the inner surface of a pipe-shaped article prepared from foamed thermoplastic resin by the method of the present invention is lined with heat resistant material there is obtained a composite pipe-shaped product having excellent heat resisting properties.

Where self extinguishment or weatherability is demanded of a pipe-shaped article prepared by the present invention, the surface of said article is preferably covered with, for example, a film of polyvinyl chloride.

What is claimed is:

1. A method for manufacturing a pipe-shaped article from foamed thermoplastic resin sheet which comprises turning a foamed thermoplastic resin sheet to form a generally pipe-shaped article, said turned sheet exhibiting internal forces tending to return said sheet back to its un-turned form, heating at least one of adjacent surfaces of said sheet, and joining the heated surfaces of said turned sheet until uniting together of said heated surfaces is complete, to form said pipe-shaped article.

2. A method for continuously manufacturing a pipe-shaped article from foamed thermoplastic resin sheet which comprises continuously turning foamed thermoplastic resin sheet so as to bring its longitudinal side faces close to each other or into contact with each other, said turned sheet exhibiting internal forces tending to return said sheet back to its un-turned form, heating said side faces, applying pressure so as to contact said side faces fully with each other, and maintaining the state of said sheet with said side faces maintained in contact until said side faces are firmly joined by cooling, thereby to produce a pipe-shaped article.

3. A method for continuously manufacturing a pipe-shaped article from foamed thermoplastic resin sheet which comprises continuously turning foamed thermoplastic resin sheet so as to bring its longitudinal side faces into face-to-face contact with each other, said turned sheet exhibiting internal forces tending to return said sheet back to its un-turned form, continuously heating said side faces, applying pressure to compress said turned sheet flat and, after fusion, maintaining said flatly compressed state until said side faces are cooled sufficiently to be firmly joined together.

4. The method according to claim 2 wherein the foamed thermoplastic resin sheet is turned over a core.

5. The method according to claim 2 wherein the foamed thermoplastic resin sheet is turned over a core to form a composite pipe-shaped article containing the core.

6. The method according to claim 5 wherein the core is a rod.

7. The method according to claim 5 wherein the core is covered with heat resistant material.

8. A method for manufacturing a multilayer pipe-shaped article from a foamed thermoplastic resin sheet which comprises:

winding the sheet about the outer circumference of a core, said wound sheet exhibiting internal forces tending to return said sheet back to its un-wound form, and heating at least one of two contact surfaces of adjacent layers of the sheet immediately prior to joining of said contact surfaces, to form a multilayer pipe-shaped article.

9. A method for continuously manufacturing a multilayer pipe-shaped article from foamed thermoplastic resin sheets which comprises:

continuously helically winding a first sheet on the outer circumference of a core in a first direction, said wound sheet exhibiting internal forces tending to return said sheet back to its un-wound form;

winding a second sheet on said wound first sheet in an opposite direction, said wound sheet exhibiting internal forces tending to return said sheet back to its un-wound form; and continuously heating at least one of two contact surfaces of the first and second sheets immediately prior to joining of said contact surfaces, to form a multilayer pipe-shaped article.

10. The method according to claim 1 wherein the foamed material of thermoplastic resin is a foam of a thermoplastic resin selected from the group consisting of polyolefin, olefin copolymers, cross-linked polyolefin, vinyl polymers, and natural rubbers and synthetic rubbers mixed with said polymers.

11. The method according to claim 1 wherein the inner surface of the pipe-shaped article of foamed thermoplastic resin is further lined with heat resistant material.

12. The method according to claim 2 wherein the molded pipe-shaped articles are heated to more than the softening temperature of the foamed resin and cooled to room temperature so as to eliminate the internal stress.

13. An apparatus for continuously manufacturing a pipe-shaped article from a foamed thermoplastic resin sheet which comprises:

a die for turning the foamed thermoplastic resin sheet so as to bring its longitudinal side faces into contact with each other, said turned sheet exhibiting internal forces tending to return said sheet back to its un-turned form;

heating means for heating said side faces;

a plurality of endless belts for maintaining said turned sheet in a condition having a flatly compressed cross section with its side faces pressed together until said side faces have sufficiently cooled to complete joining of said side faces.

14. The apparatus according to claim 13 comprising a guide roll located between said die and said endless belts for applying a stress to the foamed thermoplastic resin sheet to press the longitudinal side faces thereof against each other.

15. An apparatus for continuously manufacturing a pipe-shaped article from a formed thermoplastic resin sheet which comprises:

a die for turning the foamed thermoplastic resin sheet so as to bring its longitudinal side faces into contact with each other, said turned sheet exhibiting internal forces tending to return said sheet back to its un-turned form;

heating means for heating said side faces of the sheet forwarded from the die; and a roll provided with a groove on the periphery thereof and an endless belt travelling through said groove receiving said heated and turned sheet and for applying a force thereto so as to maintain said turned sheet in a condition having a flatly compressed cross section with its side faces pressed together until said side faces have sufficiently cooled to complete joining of said side faces.

16. The method according to claim 5 wherein the core is a pipe.

17. The method according to claim 5 wherein the core is a wire.

18. The apparatus according to claim 13 comprising four endless belts respectively abutting the upper, lower and side surfaces of said turned sheet to maintain said flatly compressed cross section.

* * * * *